United States Patent
Iovanna et al.

(10) Patent No.: US 10,080,205 B2
(45) Date of Patent: Sep. 18, 2018

(54) METHOD AND APPARATUS FOR DETERMINING SYNCHRONISATION REFERENCES

(71) Applicant: Telefonaktiebolaget L M Ericsson (publ), Stockholm (SE)

(72) Inventors: Paola Iovanna, Rome (IT); Mats Forsman, Rönninge (SE); Stefano Ruffini, Rome (IT); Tomas Thyni, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 179 days.

(21) Appl. No.: 14/771,120

(22) PCT Filed: Jul. 6, 2015

(86) PCT No.: PCT/SE2015/050795
§ 371 (c)(1),
(2) Date: Aug. 27, 2015

(87) PCT Pub. No.: WO2017/007381
PCT Pub. Date: Jan. 12, 2017

(65) Prior Publication Data
US 2017/0142676 A1    May 18, 2017

(51) Int. Cl.
*H04W 56/00* (2009.01)
*H04W 72/04* (2009.01)
*H04J 3/06* (2006.01)

(52) U.S. Cl.
CPC ....... *H04W 56/0015* (2013.01); *H04J 3/0641* (2013.01); *H04W 72/0446* (2013.01); *H04J 3/0667* (2013.01)

(58) Field of Classification Search
CPC ......... H04W 56/0015; H04W 72/0446; H04W 72/042; H04W 84/047; H04L 5/0053; H04L 5/0023; H04L 5/001
See application file for complete search history.

(56) References Cited

U.S. PATENT DOCUMENTS

| 2012/0287948 A1 | 11/2012 | Ruffini et al. | |
| 2013/0039220 A1* | 2/2013 | Ruffini | H04J 3/0679 370/255 |

(Continued)

FOREIGN PATENT DOCUMENTS

| WO | 2011060965 A1 | 5/2011 |
| WO | 2016127392 A1 | 8/2016 |

OTHER PUBLICATIONS

Bladsjö, D. et al., "Synchronization Aspects in LTE Small Cells", IEEE Communications Magazine, vol. 51, Iss. 9, Sep. 2013, pp. 70-77.

(Continued)

*Primary Examiner* — Jung Park
(74) *Attorney, Agent, or Firm* — Murphy, Bilak & Homiller, PLLC (57) ABSTRACT

A backhaul domain of the communication network is determined 400, and a request for a synchronization reference is received 402 from the first access node, the request comprising, ID:s of the first and second access nodes. For each one of the first and second access nodes, a first and a second combination are determined 404 of a first and a second respective synchronization reference and related synchronization paths extending between synchronization reference nodes of the synchronization references and the access nodes. For each one of the first and second access nodes, the first or the second combination of synchronization reference and related synchronization path is selected 406 based on synchronization requirements for the first and second access (Continued)

nodes, and the first path or the second path is requested to be set-up 408 according to the selected 406 combination. By providing functionality which works on the top of existing control of radio and transport domains, appropriate synchronization references may be determined with a limited amount of information exchanged between the respective domains.

15 Claims, 7 Drawing Sheets

(56) References Cited

U.S. PATENT DOCUMENTS

| | | | |
|---|---|---|---|
| 2013/0259049 A1 | 10/2013 | Mizrahi | |
| 2014/0029603 A1* | 1/2014 | Nomura | H04W 56/0015 370/350 |
| 2014/0092895 A1* | 4/2014 | Nylander | H04W 56/0015 370/350 |
| 2014/0355628 A1 | 12/2014 | Akhlaq et al. | |
| 2015/0092738 A1* | 4/2015 | Chakraborty | H04L 5/0005 370/330 |
| 2015/0127978 A1* | 5/2015 | Cui | H04L 69/28 714/15 |
| 2015/0156736 A1 | 6/2015 | Guo et al. | |
| 2015/0327204 A1* | 11/2015 | Park | H04W 56/0015 370/350 |
| 2015/0373657 A1* | 12/2015 | Kim | H04W 56/0015 370/350 |
| 2016/0100374 A1* | 4/2016 | Choi | H04W 56/0015 370/331 |

OTHER PUBLICATIONS

Unknown, Author, "IEEE Standard for a Precision Clock Synchronization Protocol for Networked Measurement and Control Systems", IEEE Instrumentation and Measurement Society, IEEE Std 1588-2008, IEEE, New York, NY, USA, Jul. 24, 2008, pp. 1-289.

* cited by examiner

Fig. 1 (existing art)

METHOD AND APPARATUS FOR DETERMINING SYNCHRONISATION REFERENCES

TECHNICAL FIELD

This description relates generally to time or phase synchronisation in communication networks. Particularly, it relates to determination of appropriate synchronisation references.

BACKGROUND

In communication networks which applies LTE (Long Term Evolution) based radio access technologies, accurate time and phase alignment of the internal clock is important. Time and phase synchronisation is required for LTE-TDD (Time Division Duplex) many LTE-FDD (Frequency Division Duplex) coordination features e.g. for joint transmission, a wireless communication device receives data from multiple cells or multiple RBSs (Radio Base Stations), which offers better performance, but puts harder requirements on synchronisation. In packet synchronisation networks, a major problem for synchronisation protocols is the variance in the send time, access time, propagation time, and the receive time.

From the infrastructure perspective, mobile operators have a broad range of topologies to support. The physical network using different technologies such as microwave, fibre and copper wire will enable/limit different capabilities and characteristics. These differences in physical transport and in the different types of topologies, creates delay and delay variation that is unpredictable.

One solution for synchronising internal clocks in communication network is to distribute PTP (Precision Time Protocol) messages from a Grandmaster entity, which in generally is located centralised in the communication network, to PTP-clients at each cell site. The PTP protocol distributes PTP messages from a Grandmaster entity to transport network nodes and access network nodes who update their internal clocks based on the received time information in order to stay synchronised. A PTP system is a distributed, networked system consisting of a combination of PTP and non-PTP devices. PTP systems include a grandmaster entity, boundary clock nodes, ordinary clock nodes, and transparent clock nodes. The grandmaster entity is a form of synchronisation master node. Often the Grandmaster entity is located in a centralized part of the network; causing PTP messages to travel multiple hops. A "boundary clock" has multiple network connections and can accurately bridge synchronisation from one network segment to another. A synchronisation master is selected for each of the network segments in the system. The root timing reference is called the Grandmaster clock. The Grandmaster entity transmits synchronisation information to the clocks that are in its network segment. The boundary clocks with a presence on that segment then relay accurate time to the other segments to which they are equally connected. The transparent clock modifies PTP messages by including appropriate timestamps as they pass through the device. The Timestamps in the PTP messages are compensated for time spent traversing the network and equipment e.g. (switch/router).

Figure 1:
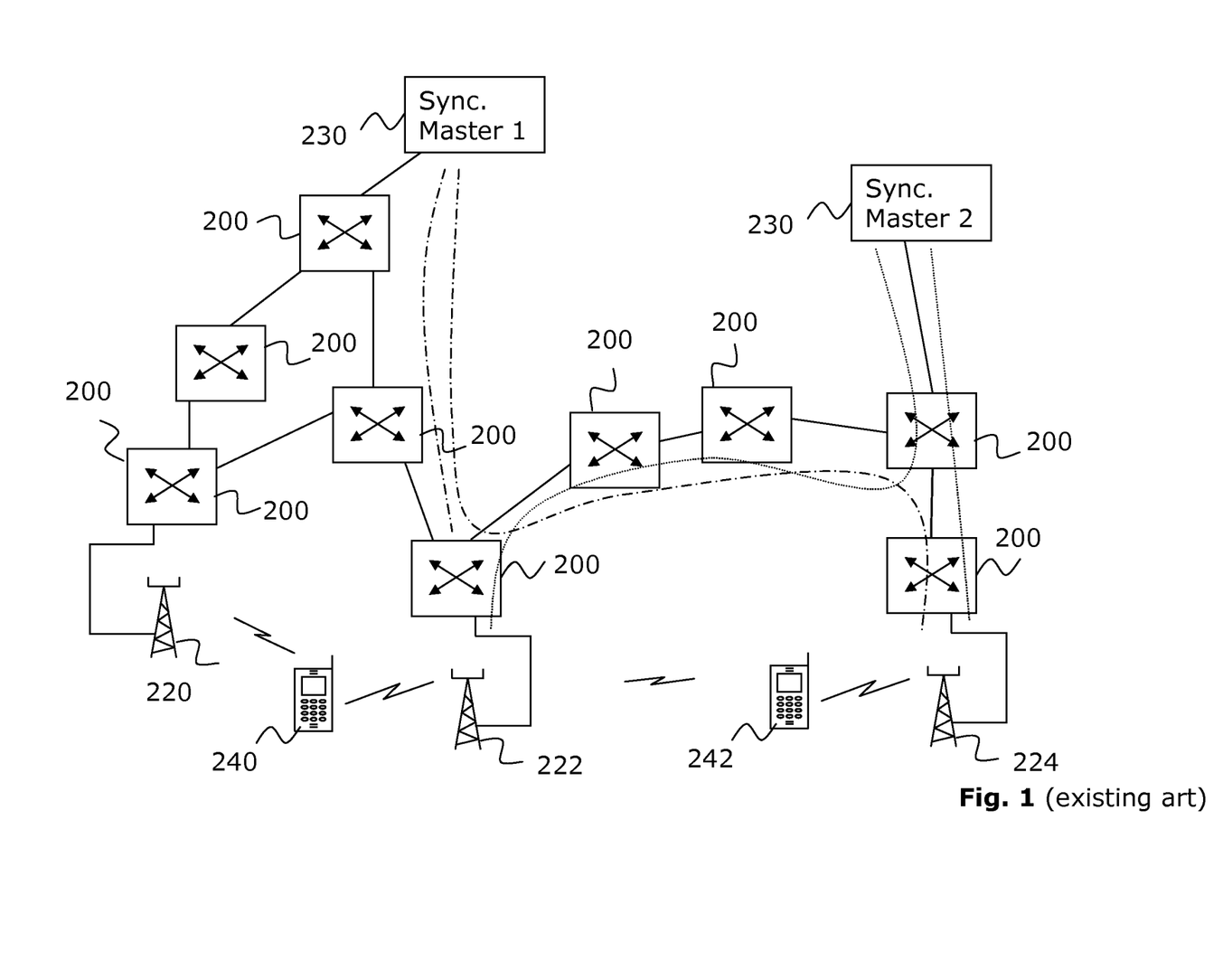
FIG. 1 is a schematic illustration of a situation in accordance with the existing art.

With reference to FIG. 1, which is a schematic overview, a scenario of a communication network will now be described according to one example.

The communication network comprises a transport network with a plurality of transport network nodes 200, e.g. suitable switches, routers or gateways. In the FIG. 1, is further illustrated, two synchronisation master nodes 230, and three radio base stations 220, 222, 224 of a suitable radio access technology, Within this disclosure, as well synchronisation master nodes 230, and radio base stations 220, 222, 224 will be referred to as transport network nodes too. In the figure a mobile telephone 242 is illustrated which communicates via an access network with the radio base stations 222, 224, in accordance with any suitable radio access technology, e.g. LTE (Long Term Evolution), LTE-Evolution, 5G (of 3GPP (Third Generation Partnership Program)), UMTS (Universal Mobile Technology System), or HSPA (High Speed Packet Access).

The synchronisation master nodes 230 produces timing references, i.e. synchronisation references which are delivered by synchronisation packets to the radio base stations 222, 224 along respective paths (marked with dash-dotted lines and dotted lines, respectively). In the figure is also another mobile telephone 240 shown, which is served by the radio base stations 220, 222.

In practice, Radio Access Networks and transport networks are offered by different vendors and or organisations which have different requirements on their respective networks.

It is desired to enable network operators to make better use of installed communication resources, e.g. in order to serve end-users more appropriately. For instance it would be desired to decrease synchronisation time inaccuracy in order implement fast communication technologies.

SUMMARY

It would be desirable to obtain improved performance for services in communication networks. It is an object of this disclosure to address at least any of the issues outlined above.

Further, it is an object to provide a harmonizer for determining backhaul domains and selecting appropriate synchronisation references in accordance with synchronisation requirements of access nodes. These objects may be met by a method and an arrangement according to the attached independent claims.

According to one aspect, a method is provided which is performed by a communication network node of a communication network for determining a synchronisation reference to be utilised by a first access node and a second access node of the communication network. The method comprises determining a backhaul domain of the communication network, and receiving, from the first access node, a request for a synchronisation reference, the request comprising identifications, ID:s of the first and second access nodes. Furthermore, for each one of the first and second access nodes, the method comprises: determining a first combination of a first synchronisation reference and a related first synchronisation path extending between a synchronisation reference node of the first synchronisation reference and the access node, and determining a second combination of a second synchronisation reference and a related second synchronisation path extending between a synchronisation reference node of the second synchronisation reference and the access node. For each one of the first and second access nodes, the method further comprises: selecting, based on synchronisation requirements for the first and second access nodes, the first or the second combination of synchronisation reference and related synchronisation path, and requesting set-up of the first path or the second path according to the selected combination.

Furthermore, within the method, determining the backhaul domain may comprise determining which of a plurality of transport network nodes that belongs to one or more sub-domains, determining interconnected transport links between the transport network nodes, or connected access nodes.

Moreover, the method may further comprise monitoring the backhaul domain and determining updated first and second combinations, selecting an updated combination and setting-up an updated path, when changes in the backhaul domain has been detected. Furthermore, when determining an appropriate synchronisation reference for a communication device which is served by a single access node, the actions of determining combinations, selecting one combination, and request set-up of the selected combination, will be performed for the single access node only.

According to a second aspect, a method is provided which is performed by a first access node of a communication network for enabling a communication network node to determine one synchronisation reference to be utilised by the first access node. The method comprises sending, to the communication network node, a request for a synchronisation reference, the sent request comprising identifications, ID:s, of the first access node and of a second access node, and in response to the request, receiving, from the communication network node, a request to configure a synchronisation reference, the synchronisation reference being selected by the communication network node based on synchronisation requirements of the first and second access nodes.

According to further aspects, a communication network node and a first access node, which are adapted to perform the method steps of any of the above described respective methods, are also provided. Both the communication network node and the first access node comprise a processor and a memory arranged to perform actions of the respective methods. Furthermore, the communication network node may be implemented as a harmonizer adapted to be arranged in the communication network.

By providing functionality which works on the top of existing control of radio and transport domains, appropriate synchronisation references may be determined with a limited amount of information exchanged between the respective domains. Thereby, differentiated synchronisation services may be configured without impact on hardware or control of the respective domains.

BRIEF DESCRIPTION OF DRAWINGS

The solution will now be described in more detail by means of exemplary embodiments and with reference to the accompanying drawings, in which.

DETAILED DESCRIPTION

There is a need for a solution which increases control and appropriateness in provisioning of synchronisation references in communication networks.

A harmonizer is a communication network node which is arranged to determine and select an appropriate combination of synchronisation reference and request set-up the synchronisation path for an access node, such as a radio base station. For radio base stations that will be using Radio co-ordination schemes the harmonizer will determine and select an appropriate synchronisation reference in order to minimize phase deviation between the radio base stations. Radio base stations may have to be time or phase synchronised for different reasons, e.g. for positioning. The Harmonizer determines a backhaul domain of transport network nodes, and one or more access domains of access nodes. Upon request for a synchronisation reference from an access node, the harmonizer determines a plurality of combinations of a synchronisation reference and a related synchronisation path, selects one of the combinations, and sets-up the synchronisation path of the selected combination.

The term "Backhaul domain" will be used in this disclosure to denote a set of transport network nodes, which are interconnected and where some of the transport network nodes are connected to specific service networks via access points. For instance some of the transport network nodes may be connected to Internet. Some of the transport network nodes may be connected to access nodes, such as radio base stations. A backhaul domain may comprise different sub-domains that may be heterogeneous. The backhaul domain is then referred to as a multi-domain and may comprise transport network nodes of:
- different data-planes, e.g. optical, packet distributed, etc.,
- different control/management planes with different protocols, e.g. traditional routing protocols, GMPLS (Generalized Multi-Protocol Label Switching), MPLS (Multi-Protocol Label Switching), NMS (Network Management System), or SDN (SoftwareDefined Network).
- different vendors,
- different administrative domains, e.g. different administrative policies,
- different domains that are considered for scalability reasons.

The term "local domain" will be used to denote a set of access nodes, e.g. radio base stations, which are arranged to communicatively connect and serve communication devices of any suitable wireless communication technology, such as UEs (User Equipments). The access nodes of a local domain are interconnected. Also the local domain may comprise multi-domains. For instance, a local domain which is controlled by a specific operator may comprise access nodes of various releases or vendors.

The harmonization of different network domains, in particular radio and transport domain, is a key aspect in network evolution e.g. towards 5G, but currently no solution exists.

In fact network synchronization especially in 5G scenarios, will be relevant for several domains, and harmonization between these domains will be particularly important. Moreover such domains could be heterogeneous, some of them based on SDN, other based on distributed control plane like traditional routing protocols or MPLS/GMPLS, other just managed by Network Management System. Thus the synchronization in this framework is a very challenging task.

Figure 2:
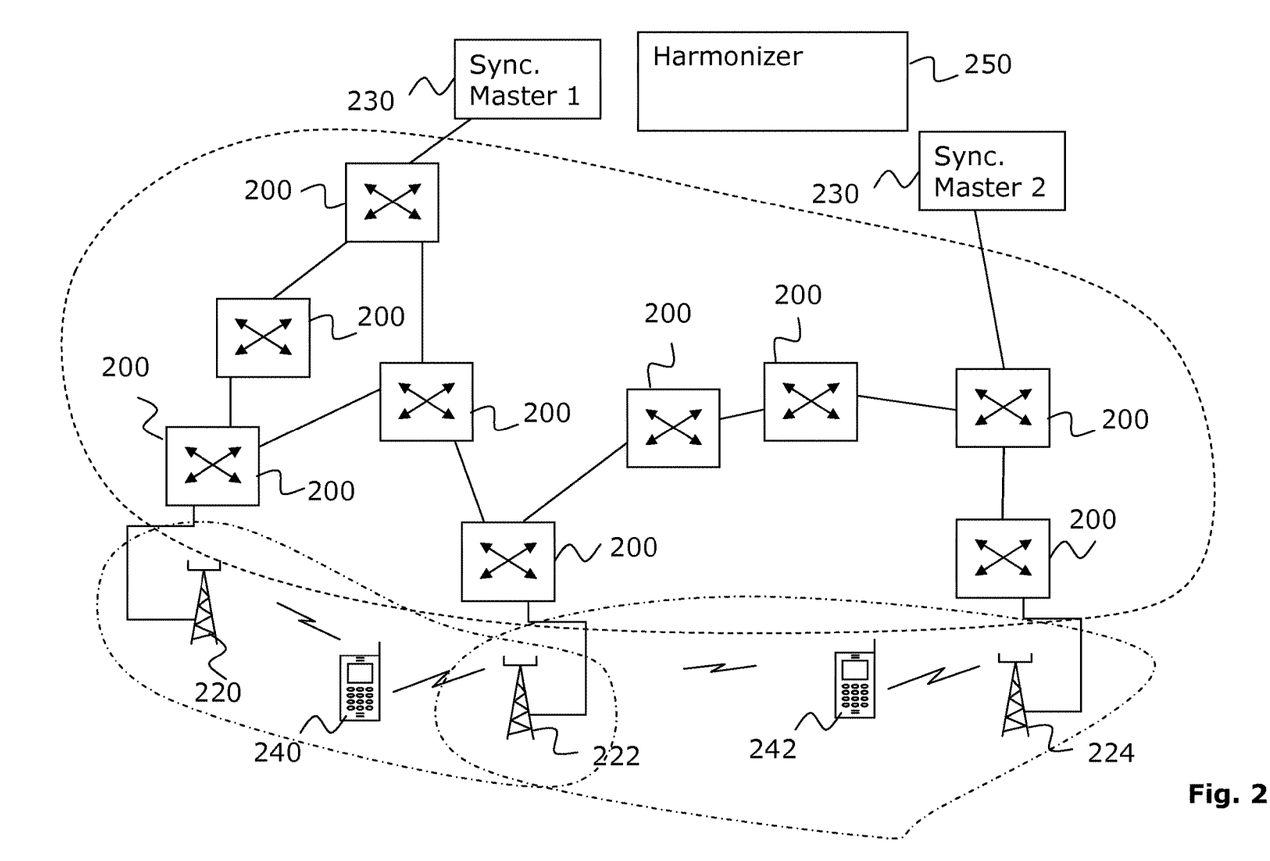
FIG. 2 is a schematic illustration of a situation, according to possible embodiments.

With reference to FIG. 2, which is a schematic overview, a situation in a communication network will now be described in accordance with one exemplifying embodiment.

The FIG. 2 is similar to the FIG. 1, for illustrative purposes the same reference numbers have been used when appropriate.

The synchronisation paths have been omitted in FIG. 2. Moreover, a backhaul domain (dashed line), two local domains (dash-dotted lines), and a harmonizer 250 have been illustrated in the FIG. 2. The harmonizer 250 is arranged to handle provisioning of synchronisation references to access nodes.

As will be described in more detail below in another embodiment, the harmonizer 250 determines the backhaul domain, i.e. the topology of the transport network nodes 200 and their interconnecting links. This determination can be triggered by various events (e.g. at an initialisation phase or at any update/upgrade in the network).

A first access node 220, 222, 224 which requests a synchronisation reference to utilise, sends a request comprising IDs (Identifications), e.g. IP-numbers (Internet Protocol) of itself and of other access nodes 220, 222, 224, e.g. a second access node, which are connected to the first access node. These connected first access node and other access nodes constitute a local domain. Prior to sending the request for a synchronisation reference, the first access node has determined the topology of the local domain.

Based on the topologies of the backhaul domain and the local domain, and synchronisation requirements of the first access node, the harmonizer 250 determines a plurality of combinations of synchronisation references and related synchronisation paths. Each combination comprises one synchronisation reference and one synchronisation path extending between a synchronisation master node and the access node. The harmonizer 250 selects at least one of the determined combinations and sets up the selected combination by sending instructions to the transport network nodes 200 along the path to forward received synchronisation packets to the next transport network node of the path. Thereby, synchronisation packets of the synchronisation reference of the selected combination will propagate along the path of the selected combination, from the synchronisation master node of the synchronisation reference to the first access node. The selection may be based on various synchronisation requirements which RBSs have provided to the harmonizer, e.g. largest allowable synchronisation inaccuracy, etc.

As will be further disclosed, the concept is not limited to the above described arrangement. For instance, specific controllers (not shown) of the backhaul domain and the local domains, respectively, may be arranged to manage the respective domains. Thereby, the harmonizer 250 will exchange information directly with the controllers, instead of each transport or access node. The controllers may be arranged to accumulate information from the domains, such as IDs of nodes, capacity of links, etc., before sending the accumulated information to the harmonizer 250. For instance, the controllers may accumulate information from a plurality of heterogeneous sub-domains, which facilitates the harmonizer 250 to handle multi-domain backhaul domains and local domains. Moreover, the selection may alternatively be performed by the RBSs. The harmoniser provides then the determined combinations to the RBSs, and one of the RBSs selects at least one of the combinations to set-up. Supplemented to the combinations, the harmoniser may then provide additional information which will be utilised by the RBSs when selecting one of the combinations.

Figure 3:
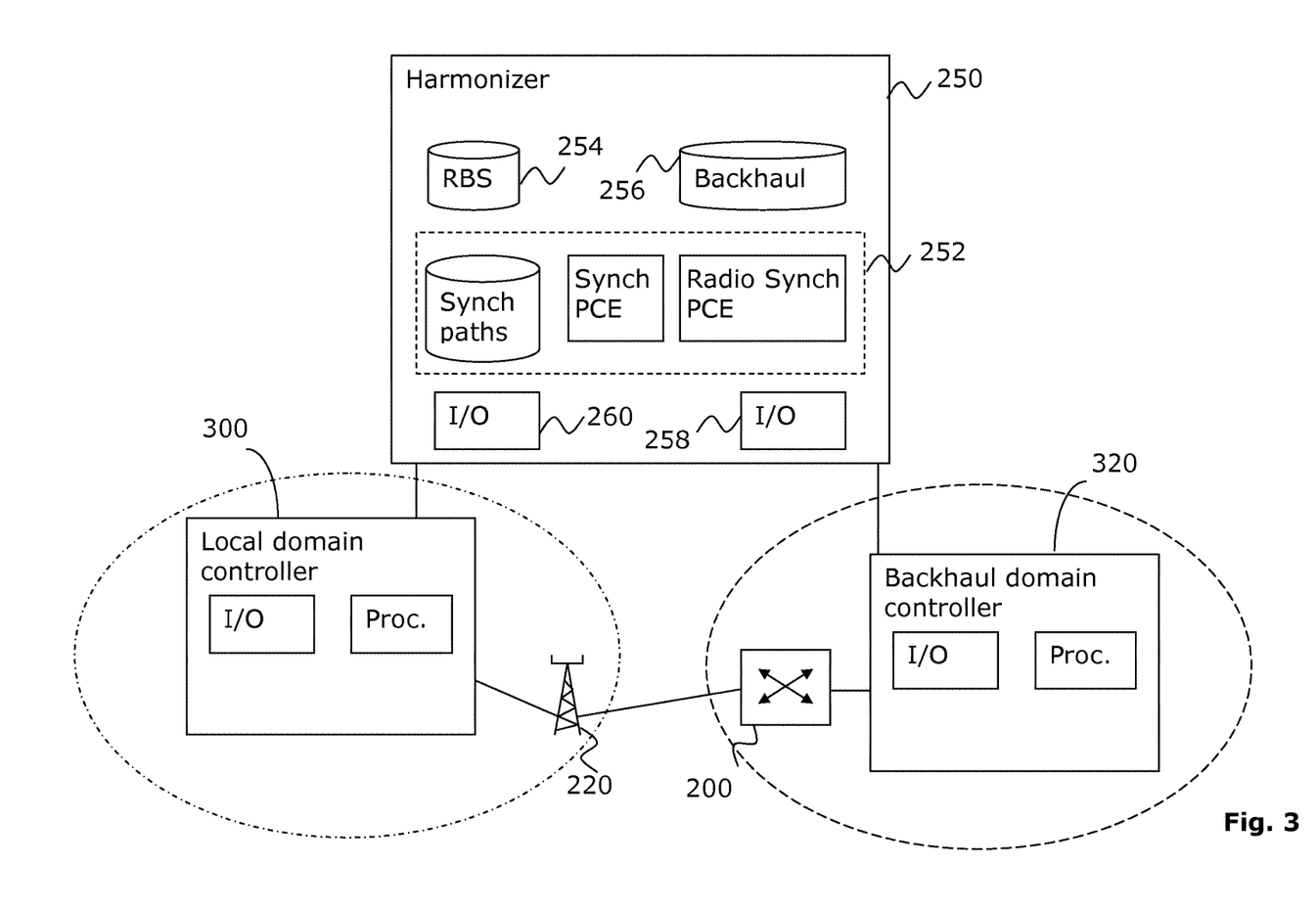
FIG. 3 is a schematic overview of a system, according to possible embodiments.

With reference to FIG. 3, which is a schematic block diagram, a harmonizer 250 for management of synchronisation references will now be described in accordance with one exemplifying embodiment.

This embodiment is related to the embodiment described in conjunction with the FIG. 2, and the same reference numbers are therefore applied when appropriate. In a communication network access nodes 220 are arranged to communicatively connect communication devices (not shown) via transport network nodes 200 to various services (not shown). In the figure, only one access node 220 and one transport network node 200 are illustrated in order to facilitate the understanding. However, when put into practice a plurality of access nodes 220 are present in the local domain and a plurality of transport network nodes are present in the backhaul domain. Furthermore, a plurality of local domains of sub-domains, and a plurality of backhaul domains or sub-domains may be present, i.e. each domain type may be implemented as a multi-domain domain. The access nodes 220 are comprised in local domains (dash-dotted oval), and the transport network nodes 200 are comprised in backhaul domains (dashed oval). A harmonizer 250 is arranged to handle provisioning of synchronisation references to the access nodes 220. The harmonizer 250 comprises an interface 258 via which the harmonizer 250 exchanges data and information with a backhaul domain controller 320. The harmonizer 250 comprises also an interface 260 via which the harmonizer 250 exchanges data and information with a local domain controller 300. However, the interfaces 258, 260 may alternatively be adapted to exchange the data or information directly with the transport network nodes 200 and the access nodes 220 within the disclosed concept. The interfaces 258, 260 are in this embodiment implemented as a BH (BackHaul) Plug-in interface, and a Radio Plug-in interface, respectively.

The harmonizer 250 comprises an RBS (Radio Base Station) database 254 which is adapted to store information or data which is received from the local domain, e.g. IDs of access nodes 220, link information, required synchronisation characteristics, etc. Correspondingly, the harmonizer 250 comprises a Backhaul database 256, which is adapted to store information or data received from the backhaul domain, e.g. IDs of transport network nodes, link information, etc.

Furthermore, the harmonizer 250 comprises a Radio synch PCE (Path Computation Element) module which is adapted to control the harmonizer 250. For instance, the Radio synch PCE module may organize lists of access nodes and transport network nodes, determine synchronisation policies to be applied, orchestrate the building blocks in the harmonizer, etc.

A Synch PCE module is arranged to determine a plurality of combinations of synchronisation reference and synchronisation path based on information which the Radio synch PCE module provides.

Furthermore, the Radio synch PCE module is arranged to select one of the combinations determined by the Synch PCE module, and set-up the path of the selected combination. When put into practice, the Radio synch PCE module does not necessarily performs the set-up of the selected path itself. As will be understood from another embodiment below, the Radio synch PCE module typically sends a request to a backhaul domain controller 320, i.e. an Operating and Maintenance entity for the Backhaul network, to set-up the selected path. In the figure is also a Synch path database arranged to store the results of the Radio synch PCE module operations. For instance, the Synch path database may store information about which synchronisation master nodes that the access nodes have to consider. As described above in another exemplifying embodiment, the functionality of selecting one of the determined combinations may be implemented in the RBSs instead of in the harmonizer.

It is to be noted that even if this embodiment defines a plurality of modules, databases and interfaces, the disclosed concept is not limited to this specific implementation. A designer may select to implement the functionality of the harmonizer 250 alternatively. For instance, he/she may implement the functionality of the Radio synch PCE module, the Synch PCE module and the Synch path database in a combined module, as indicated (dashed rectangle). In another alternative implementation, the harmonizer 250 may be implemented as a processor and a memory, wherein the memory comprises computer readable code which when executed by the processor causes the harmonizer 250 to perform the operations of the harmonizer which has been described, or the operations of the harmonizer which will be described below in another exemplifying embodiment. The harmonizer may alternatively be implemented according to the SDN framework.

In another exemplifying embodiment, a local domain controller 300 will now be described. The local domain controller 300 comprises a processor and an interface module. The processor is arranged to exchange information or data between the harmonizer 250 and individual access nodes 220 via the interface module. The interface module comprises a Radio Plug-in interface and an RBS (Radio Base Station) management interface. Alternatively, the local domain controller 300 may be further adapted to organize a plurality of access nodes 220 in a local domain, e.g. a multi-domain, before exchanging data or information with the harmonizer 250.

In a further exemplifying embodiment, a backhaul domain controller 320 will now be described. The backhaul domain controller 320 comprises a processor and an interface module. The processor is arranged to exchange information or data between the harmonizer 250 and individual transport nodes 200 via the interface module. The interface module comprises a BH Plug-in interface and a Backhaul management interface, e.g. in accordance with SDN (Software Defined Network), NMS (Network Management System), distributed control plane, such as MPLS/GMPLS, etc. In a further exemplifying embodiment, a backhaul domain controller could be any type of control (e.g. distributed, centralized, hybrid, etc.) that is in charge to control/manage the backhaul domain. Alternatively, the backhaul domain controller 320 may be further adapted to organize a plurality of transport network nodes 200 in a backhaul domain, e.g. a multi-domain, before exchanging data with the harmonizer 250.

By arranging a harmonizer, so called programmability will be achieved in the communication network. For instance, the harmonizer may perform any of:

1. Configuring differentiated synchronisation services without impact on the hardware and on the control of the domains, i.e. the local (radio) domain, or the backhaul (transport) domain.

2. Modifying the synchronisation features in one of the transport domains with minimum impact on the other transport domains and on the radio domains. That could happen for several reasons: for example a transport domain could change topology for increasing dimensioning, or for failure, or some nodes of the transport domain change synchronisation capability.

3. Modifying synchronisation features required from radio because radio domain upgrades/modifies the synchronisation features (e.g. some RBSs change synchronisation selection capability or other).

4. Each domain could get upgraded/modified synchronisation features or topology independently of the other domain.

Figure 4:
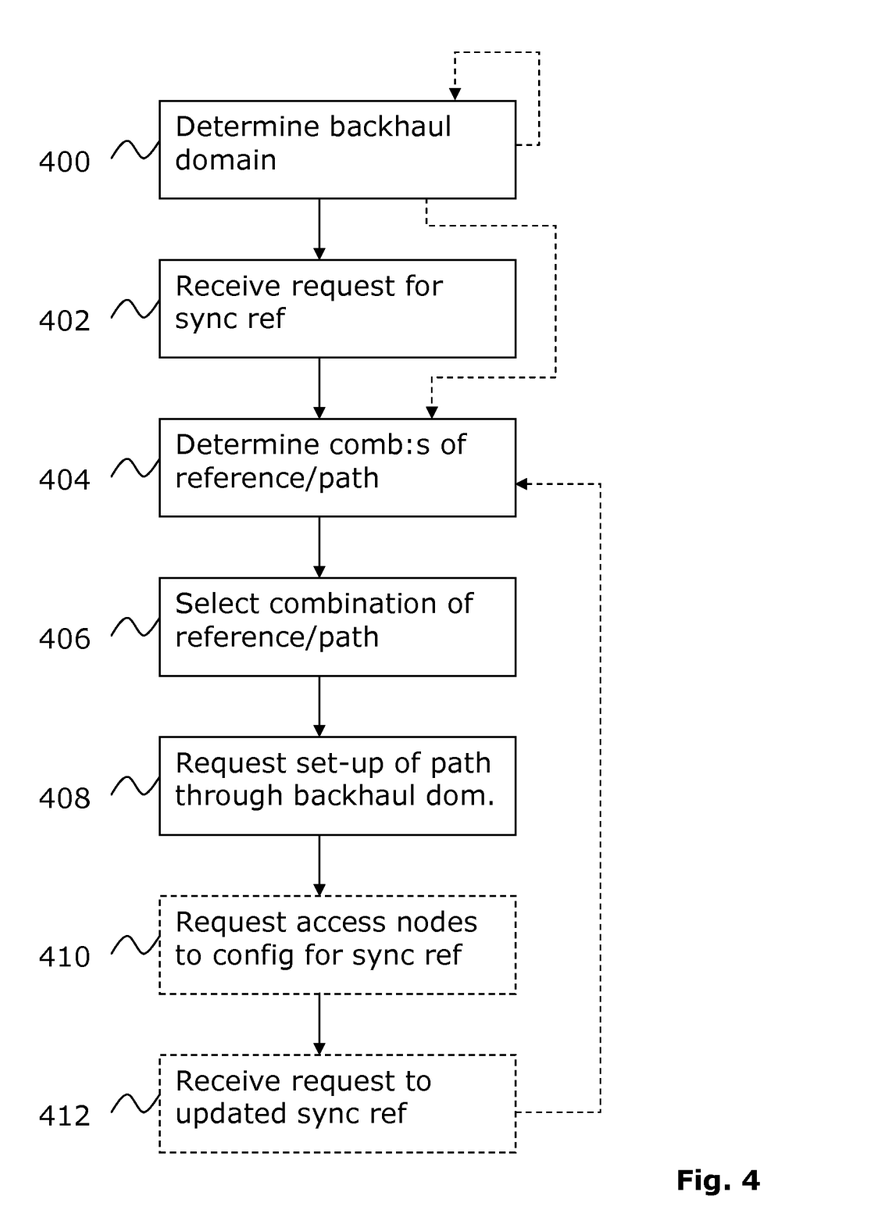
FIG. 4 is a schematic flow chart of a method, according to a possible embodiment.

With reference to FIG. 4, which is a schematic block diagram, a method performed by a harmonizer will now be described in accordance with one exemplifying embodiment.

In a first action 400, a backhaul domain is determined by the harmonizer. The determination may be performed during initialisation of the backhaul network database in the harmonizer, or at any network update or upgrade, as described above in another embodiment. When determining the backhaul domain, the harmonizer receives information regarding which transport network nodes that are present and which links that interconnects the transport network nodes. The information could be detailed and completed or abstracted (i.e. a subset of information is provided to the harmonizer to provide the need information of the domain). Optionally, the harmonizer may receive further information, e.g. link statuses, vendors or releases of the transport network nodes, etc. The harmonizer may also receive information regarding which access nodes that are connected to any transport network node of the backhaul domain. In this embodiment, as well the information and the optional information may be received via Netconf, ANR (Automatic Neighbour Relation), PCE-P (Path Computation Element-Protocol)

In a following action 402, the harmonizer receives a request originating from a first access node for a synchronisation reference. The request may be received at a local domain interface of the harmonizer, either directly from the first access node or via a local domain controller, as described above in another embodiment. The request comprises IDs (IDentifications) of the first access node and further access nodes of the local domain. The request may in addition comprise synchronisation requirements for the first access node and the associated local domain.

In a subsequent action 404, the harmonizer determines a plurality of possible combinations of synchronisation reference and related synchronisation path for each of the access nodes. It is to be noted that a synchronisation reference node may provide a plurality of different synchronisation references and that each one of the synchronisation references may have to propagate along more than one synchronisation path from the synchronisation reference node to the access node. In addition there may be more than one synchronisation reference node that provides synchronisation references. Thus, when determining a combination, the harmonizer may determine: an appropriate synchronisation reference, and a synchronisation path extending from the synchronisation reference node of the synchronisation reference and the first access node. For instance, for each access node, the harmonizer may determine a first combination of a first synchronisation reference and a related first synchronisation path, and a second combination of a second synchronisation reference and a related second synchronisation path. Furthermore, the harmonizer may take received synchronisation requirements into account when determining the combination. Alternatively, appropriate standard synchronisation requirements may instead be pre-stored in the harmonizer. Thereby, the In a following action 406, the harmonizer selects one of the possible combinations for each access node based on synchronisation requirements, e.g. pre-stored or synchronisation requirements received with the request. Typically, the harmonizer may select the combinations such that the same synchronisation reference is selected for each one of the access nodes of a local domain or sub-domain.

In another action 408, for each access node, the harmonizer requests set-up of the synchronisation path according to the selected combination, where the synchronisation path extends from the synchronisation node of the synchronisation reference to the access node.

Thereby, the access nodes of the local domain will be enabled to utilise an appropriate synchronisation reference when communicating via the backhaul network. Typically, the synchronisation reference node of the selected synchronisation reference will distribute synchronisation packets, e.g. PTP (Precision Time Protocol) 1588 packets along the respective synchronisation paths to the access nodes.

In an optional action 410, which is performed after the action 408, the harmonizer may request the access nodes to utilise the selected synchronisation reference via the respective synchronisation paths, e.g. the harmonizer confirms that the synchronisation paths are requested to be set-up before being utilised.

In another optional action 412, which is illustrated as the last action without being limited thereto, the harmonizer detects changes of the local domain and repeats the actions 404-408 by determining updated combinations, etc.

The action 412 is a monitoring of changes of the local domain(s) and may be performed at any stage of the method. For instance, when an access node has detected a change of its local domain, it may request the harmonizer to determine updated combinations of synchronisation references and synchronisation paths. Alternatively, the harmonizer may continuously request the access nodes which it serves whether they have detected any changes.

In another exemplifying embodiment, which is based on some above described embodiments, the harmonizer monitors the backhaul domain in order to detect changes of anyone of the transport network nodes or the interconnecting links. Moreover, when monitoring, the harmonizer may detect new or lost synchronisation references and corresponding synchronisation reference nodes, etc. When detecting any change, the harmonizer updates its stored information of the backhaul domain according to the detected change. Thereby, the harmonizer will get access to the current status of the backhaul domain when determining the combinations in the action 404, such that appropriate synchronisation references may be provided to the access nodes and appropriate synchronisation paths may be requested to be set-up in the action 408 In the figure the monitoring is indicated as a dashed line which returns to the action 400 in a loop from the action 400. However, the harmonizer is not limited to detect changes during the initialisation only, and a designer may implement functionality in the harmonizer for continuously monitoring changes in the backhaul domain, i.e. detecting changes at any stage of the above described method. When a change is detected, the method may return to action 400 and repeat the following actions. As seen in the figure, the action 402 of receiving a request for synchronisation reference may be omitted, and updated combinations of synchronisation reference and synchronisation path may then be determined. Thereby, the harmonizer may continuously react on detected changes, such that updated synchronisation references are provided via updated paths from appropriate synchronisation reference nodes to the access nodes, which may improve flexibility in provisioning of synchronisation references.

It is to be noted that the action 400 of determining the backhaul domain may comprise determining further parameters and actions. For instance, the harmonizer may determine that the backhaul domain comprises a plurality of sub-domains, e.g. sub-domains of different operators, vendors, product generations, releases, enterprises, etc. Thereby, the harmonizer may support multi-domain functionality.

Even if the exemplifying embodiments are disclosed for determination of appropriate synchronisation references when a communication device is served by a plurality of access nodes, the disclosed concept is not limited thereto. Appropriate synchronisation references may have to be determined and requested also for communication devices which are served by single access nodes, e.g. RBSs. The above described concept may then be applied with minor modifications, which will be described in accordance with a related exemplifying embodiment.

This exemplifying embodiment differs in that the actions 404-408 are just performed for the single access node instead of for each one of the plurality of access nodes.

Figure 5:
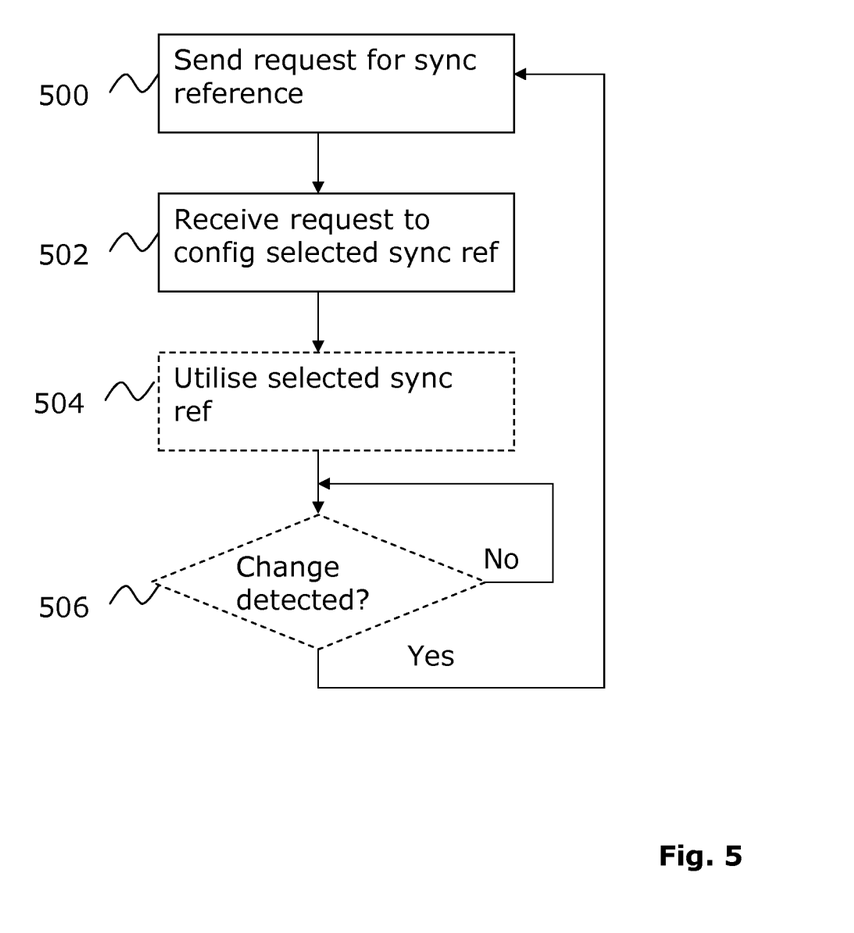
FIG. 5 is a schematic flow chart of a method, according to a possible embodiment.

With reference to FIG. 5, which is a schematic flowchart, a method performed by a first access node will now be described in accordance with one exemplifying embodiment.

In a first action 502, the first access node sends a request for a synchronisation reference to be utilised when communicating with a communication device, such as a UE (User Equipment). The first access node will serve the communication device together with second access node. Both the first and the second access nodes will utilise one and the same synchronisation reference to fulfil various synchronisation requirements. When sending the request, the first access node sends its ID (Identification), e.g. IP (Internet Protocol) number with the request. In addition, the first access node sends the ID of the second access node and other access nodes of a local domain.

In a following action 502, the first access node receives a request to configure a synchronisation reference from the harmonizer. The synchronisation reference has been selected by the harmonizer based on synchronisation requirements of the first and second access nodes.

The received synchronisation reference may then in an optional action 504, be utilised when communicating with the communication device.

In yet another optional action 506, the first access node monitors whether changes of the local domain arises. As long as no change is detected, the first access node continues monitoring, but when a change is detected it sends a request for an updated synchronisation reference to the harmonizer, i.e. returns to action 500. Typical changes to be detected are: change of synchronisation characteristics required, need for co-ordination with a different set of other access nodes, lost contact with other access nodes of the local domain, disconnected or broken communication links, new access nodes, software updates of any access nodes, etc.

In another exemplifying embodiment which is based on the above described one, the first access node further sends synchronisation requirements of the local domain together with the request of action 502, the synchronisation requirements to be taken into account by the harmonizer when selecting synchronisation reference.

Figure 6:
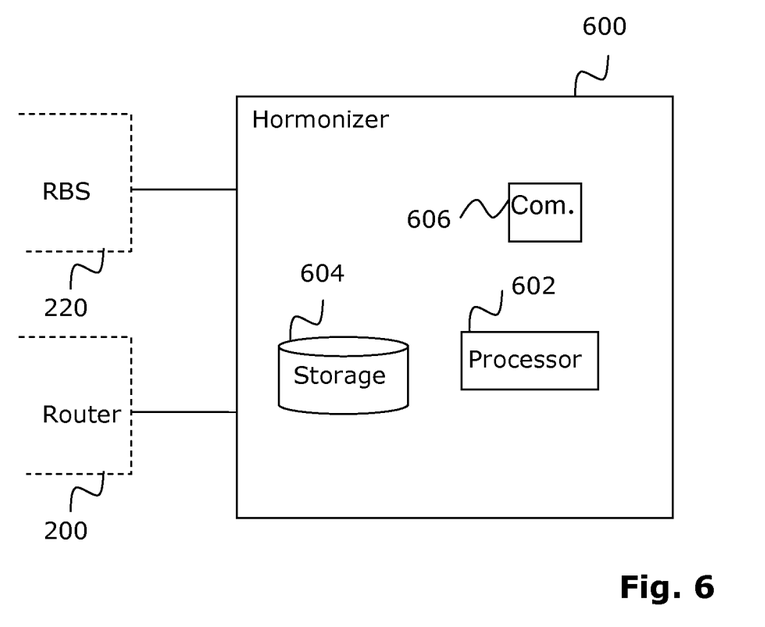
FIG. 6 is a schematic block diagram of an arrangement, according to possible embodiments.

With reference to FIG. 6, which is a schematic block diagram, a harmonizer 600 will now be described in accordance with one example embodiment.

The harmonizer 600 is adapted to be arranged in a communication network for determining appropriate synchronisation references for access nodes, e.g. RBSs in local domains of the communication network and request set-up of synchronisation paths from synchronisation reference nodes through backhaul domains to the access nodes.

The harmonizer 600 comprises a processor 602, a storage unit 604 (e.g. a memory of any suitable type), and optionally a communication unit 606.

The processor 602 is adapted to execute instructions which are stored in the storage unit 604. The instructions may be stored as computer readable code which the processor interprets, and in accordance with the instructions the processor 602 causes the harmonizer 600 to determine the current backhaul domain(s). Furthermore, the processor 602 causes the harmonizer 600 to select the most appropriate synchronisation references and their respective related synchronisation paths for the access nodes of the local domain(s) and request set-up of the selected synchronisation paths through the backhaul domain(s).

The determination of the backhaul domain(s) may be performed correspondingly as in the action 400 of another exemplifying embodiment described in conjunction with FIG. 4, and will therefore not be further discussed herein. The processor 602 may receive (e.g. via the communication unit 606) a request for an appropriate synchronisation reference from a first access node, e.g. the RBS (Radio Base Station) 220 of a local domain which includes IDs (Identifications, such as IP (Internet Protocol) numbers) of the first access node and other access nodes. Based on the request and required synchronisation characteristics of the access nodes, the processor may determine two or more possible combinations of synchronisation references and related synchronisation paths. The determination of possible combinations, the selection of combinations, and requesting the set-up of synchronisation paths may be performed as in the actions 404-408 of another exemplifying embodiment above.

The optional communication unit 606 is adapted to communicate with the RBS 220, e.g. for receiving requests for synchronisation references, and with routers and other backhaul nodes, e.g. for determining the backhaul domain. It is to be noted that the processor 602 may be adapted to handle as well backhaul sub-domains and local sub-domains, so called multi domains.

Figure 7:
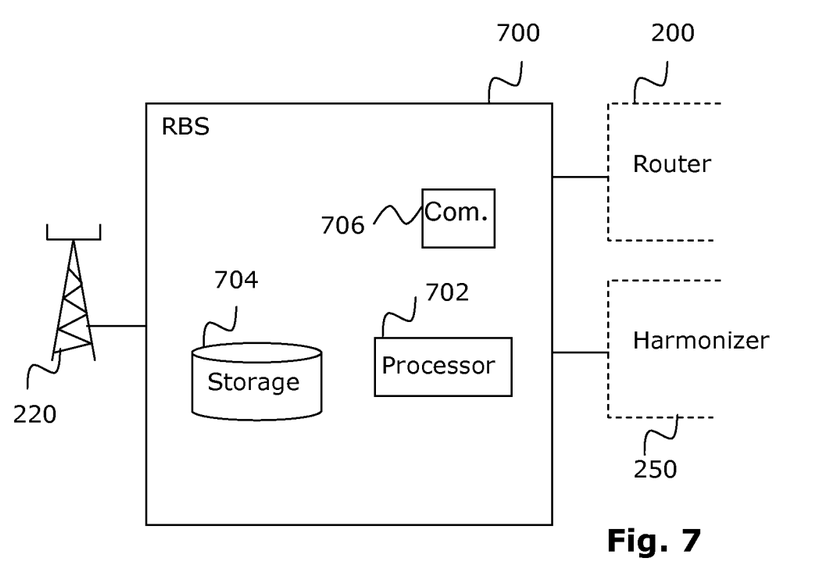
FIG. 7 is a schematic block diagram of an arrangement, according to possible embodiments.

With reference to FIG. 7, which is a schematic block diagram, an access node 700 will now be described in accordance with one example embodiment.

The access node 700 is adapted to be arranged together with other access nodes in a local domain of a communication network. The access node 700 may be an RBS of any suitable access technology.

The access node 700 comprises a processor 702, a storage unit 704 (e.g. a memory of any suitable type), and optionally a communication unit 706.

The processor 702 is adapted to execute instructions which are stored in the storage unit 704. The instructions may be stored as computer readable code which the processor interprets, and in accordance with the instructions the processor 702 causes the access node 700 to send a request for a synchronisation reference to a harmonizer 250 of the communication network. The synchronisation reference is intended to be utilised by the access node 700 and at least one further access node. The request comprises IDs of the access node 700 and the further access nodes.

Furthermore, in accordance with the instructions the processor 702 causes the access node to receive a request from the harmonizer 250 to configure a selected synchronisation reference. When utilising the configured synchronisation reference, the processor 702 may receive synchronisation packets of the selected synchronisation reference from routers 200 or other suitable backhaul nodes, wherein the synchronisation packets propagates along a path related to the selected synchronisation reference. As well the request for the synchronisation reference and the request to configure the selected synchronisation reference may be communicated via the optional communication unit 706.

The processor 702 may be adapted to send the request for the synchronisation reference correspondingly as in the action 500 of another described exemplifying embodiment. Correspondingly, the processor 702 may be adapted to receive the request for configuring the selected synchronisation reference as in the action 502 of another described exemplifying embodiment.

Figure 8:
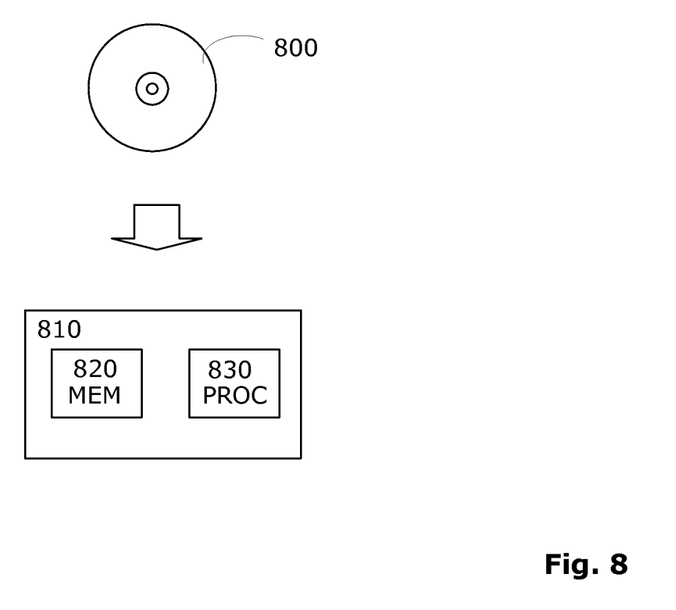
FIG. 8 is a schematic block diagram of a computer program product, according to a possible embodiment.

According to some exemplifying embodiments, a computer program product comprises a computer readable medium such as, for example, a diskette or a CD-ROM (Compact Disc Read Only Memory) as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the methods shown in the FIGS. 4 and 5.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit, module, or node may be implemented in another suitable unit, module, or node when put into practice. The disclosed harmonizer is also not limited to be implemented as a specific physical node. A designer may select to implement corresponding synchronisation harmonizing functions as virtual nodes in any suitable nodes which are connected to the communication network, within the disclosed concept.

The functions of the various elements including functional blocks may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analogue) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a communication network node of a communication network for determining a synchronisation reference to be utilised by a first access node and a second access node of the communication network, the method comprising:
   determining a topology of a backhaul domain of the communication network;
   receiving, from the first access node, a request for a synchronisation reference, the request comprising identifications (IDs) of the first and second access nodes; and
   determining, for each one of the first and second access nodes, two or more possible combinations of synchronisation references in the communication network and corresponding synchronisation paths through the backhaul domain;
   selecting, as a selected combination for each one of the first and second access nodes, one of the possible combinations of synchronisation references and corresponding synchronisation paths, based on synchronisation requirements for the first and second access nodes; and
   requesting set-up of the synchronisation paths associated with the selected combinations.

2. The method according to claim 1, wherein determining the topology of the backhaul domain comprises determining which ones of a plurality of communicatively connected transport network nodes belong to one or more sub-domains and determining interconnecting transport links between the transport network nodes.

3. The method according to claim 2, wherein determining the topology of the backhaul domain comprises determining a plurality of access nodes which are communicatively connected to any of the transport network nodes, the plurality of access nodes comprising the first and second access nodes.

4. The method according to claim 1, further comprises receiving, with the request, the synchronisation requirements.

5. The method according to claim 1, wherein said selecting includes selecting the same synchronisation reference for both the first access node and the second access node.

6. The method according to claim 1, further comprising monitoring the backhaul domain, and responsive to detecting a change of the backhaul domain, repeating, in dependence on the detected change in the backhaul domain, said steps of determining, selecting, and requesting.

7. The method according to claim 1, further comprising receiving, from the first or second access node, a request for an updated synchronisation reference, the request for the updated synchronisation reference being sent in response to a detected change of the first or second access node, and in response to the request for an updated synchronisation reference, repeating, in dependence on the detected change of the first or second access node, said steps of determining, selecting, and requesting.

8. A communication network node configured to determine a synchronisation reference to be utilised by a first access node and a second access node of the communication network, the communication network node comprising:
   a processor and a memory;
   the memory storing instructions that, when executed by the processor, cause the communication network node to:
      determine a topology of a backhaul domain of the communication network;
      receive, from the first access node, a request for a synchronisation reference, the request comprising identifications (IDs) of the first and second access nodes; and
      determine, for each one of the first and second access nodes, two or more possible combinations of synchronisation references in the communication network and corresponding synchronisation paths through the backhaul domain;
      select, as a selected combination for each one of the first and second access nodes, one of the possible combinations of synchronisation references and corresponding synchronisation paths, based on synchronisation requirements for the first and second access nodes; and
      request set-up of the synchronisation paths associated with the selected combinations.

9. The communication network node according to claim 8, wherein the memory stores instructions that, when executed by the processor, cause the communication network node to:
   determine the topology of the backhaul domain by determining which ones of a plurality of communicatively connected transport network nodes belong to one or more sub-domains and determining interconnecting transport links between the transport network nodes.

10. The communication network node according to claim 9, wherein the memory stores instructions that, when executed by the processor, cause the communication network node to:
determine the topology of the backhaul domain by determining a plurality of access nodes which are communicatively connected to any of the transport network nodes, the plurality of access nodes comprising the first and second access nodes.

11. The communication network node according to claim 8, wherein the memory stores instructions that, when executed by the processor, cause the communication network node to receive the synchronisation requirements for the first and second access nodes with the request for the synchronisation reference.

12. The communication network node according to claim 8, wherein the memory stores instructions that, when executed by the processor, cause the communication network node to select the same synchronisation reference for both the first access node and the second access node.

13. The communication network node according to claim 8, wherein the memory stores instructions that, when executed by the processor, cause the communication network node to monitor the backhaul domain and, responsive to when detecting a change of the backhaul domain, re-determine, for each one of the first and second access nodes, the two or more possible combinations of synchronisation references and corresponding synchronisation paths, in dependence on the detected change of the backhaul domain, re-select, as a re-selected combination for each one of the first and second access nodes, one of the re-determined possible combinations of synchronisation references and corresponding synchronisation paths, and re-request set-up of the synchronisation paths associated with the re-selected combinations.

14. The communication network node according to claim 8, wherein the memory stores instructions that, when executed by the processor, cause the communication network node to receive, from the first or second access node, a request for an updated synchronisation reference, the request for the updated synchronisation reference being sent in response to a detected change of the first or second access node, and in response to the request for an updated synchronisation reference, re-determine, for each one of the first and second access nodes, the two or more possible combinations of synchronisation references and corresponding synchronisation paths, in dependence on the detected change of the first or second access node, re-select, as a re-selected combination for each one of the first and second access nodes, one of the re-determined possible combinations of synchronisation references and corresponding synchronisation paths, and re-request set-up of the synchronisation paths associated with the re-selected combinations.

15. A non-transitory computer-readable medium storing a computer program comprising program instructions that, when executed by at least one processor of a communication network node configured for operation in a communication network, configures the communication network node for determining a synchronisation reference to be utilised by a first access node and a second access node of the communication network, the computer program comprising program instructions configuring the network node to:
determine a topology of a backhaul domain of the communication network;
receive, from the first access node, a request for a synchronisation reference, the request comprising identifications (IDs) of the first and second access nodes; and
determine, for each one of the first and second access nodes, two or more possible combinations of synchronisation references in the communication network and corresponding synchronisation paths through the backhaul domain;
select, as a selected combination for each one of the first and second access nodes, one of the possible combinations of synchronisation references and corresponding synchronisation paths, based on synchronisation requirements for the first and second access nodes; and
request set-up of the synchronisation paths associated with the selected combinations.

* * * * *